(12) United States Patent
Yokote

(10) Patent No.: US 7,137,474 B2
(45) Date of Patent: Nov. 21, 2006

(54) SUPPORT STRUCTURE OF HIGH PRESSURE CONTAINER

(75) Inventor: Masatsugu Yokote, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 44 days.

(21) Appl. No.: 10/250,309

(22) PCT Filed: Sep. 20, 2002

(86) PCT No.: PCT/JP02/09695

§ 371 (c)(1),
(2), (4) Date: Jun. 30, 2003

(87) PCT Pub. No.: WO03/038332

PCT Pub. Date: May 8, 2003

(65) Prior Publication Data

US 2004/0075034 A1    Apr. 22, 2004

(30) Foreign Application Priority Data

Oct. 30, 2001    (JP) .............................. 2001-332721

(51) Int. Cl.
*B60K 15/067* (2006.01)
(52) U.S. Cl. ..................... 180/314; 180/69.4; 248/500; 224/546
(58) Field of Classification Search ............... 180/69.4, 180/69.5, 68.5, 314, 65.1; 280/834, 79.6, 280/769; 220/562, 560.07, 560.11; 248/671, 248/500, 312; 224/531, 537, 539, 546, 547, 224/552, 557, 571
See application file for complete search history.

(56) References Cited

U.S. PATENT DOCUMENTS

| 3,156,379 | A   |   | 11/1964 | Corlet |
|-----------|-----|---|---------|--------|
| 5,385,263 | A   |   | 1/1995  | Kirk et al. |
| 5,518,272 | A   | * | 5/1996  | Fukagawa et al. .......... 280/834 |
| 5,673,939 | A   | * | 10/1997 | Bees et al. .................. 280/831 |
| 5,794,979 | A   | * | 8/1998  | Kasuga et al. .............. 280/834 |
| 5,997,040 | A   | * | 12/1999 | Fukagawa et al. .......... 280/834 |
| 6,042,071 | A   | * | 3/2000  | Watanabe et al. ........... 248/313 |
| 6,086,103 | A   | * | 7/2000  | Fukagawa et al. .......... 280/830 |
| 6,240,909 | B1  | * | 6/2001  | Scott .......................... 123/527 |
| 6,257,360 | B1  |   | 7/2001  | Wozniak et al. |
| 6,367,573 | B1  | * | 4/2002  | Scott .......................... 180/314 |
| 6,418,962 | B1  | * | 7/2002  | Wozniak et al. ............. 137/266 |
| 6,502,660 | B1  | * | 1/2003  | Scott et al. .................. 180/314 |
| 6,536,722 | B1  | * | 3/2003  | Sadowski et al. ........... 248/154 |
| 6,557,596 | B1  | * | 5/2003  | Ono et al. ............... 141/311 A |
| 6,672,620 | B1  | * | 1/2004  | Kawazu et al. ............. 280/834 |
| 6,676,163 | B1  | * | 1/2004  | Joitescu et al. ............. 280/834 |
| 6,782,914 | B1  | * | 8/2004  | Kami et al. .................. 137/312 |
| 2003/0189334 | A1 | * | 10/2003 | Kawasaki et al. .......... 280/834 |

FOREIGN PATENT DOCUMENTS

FR    1 295 539    6/1962

(Continued)

*Primary Examiner*—Jeff Restifo
(74) *Attorney, Agent, or Firm*—Foley & Lardner LLP

(57) ABSTRACT

A support structure for a container (1) provided with neck portions (47, 49) on both ends of a longitudinal direction thereof which includes; a first support member (5) for supporting one of the neck portions (47, 49) of the container (1); a second support member (7) for supporting the other of the neck portions (47, 49) of the container (1), and elastically pressing the container (1) in the longitudinal direction thereof; and a frame (3) to which the first and second support members (5, 7) are fixed.

12 Claims, 7 Drawing Sheets

FOREIGN PATENT DOCUMENTS

| | | |
|---|---|---|
| FR | 1 604 703 | 3/1972 |
| FR | 2 536 373 A1 | 5/1984 |
| GB | 1 220 251 | 1/1971 |
| JP | 57-92681 U | 6/1982 |
| JP | 62-132818 U | 8/1987 |
| JP | 8-75099 A | 3/1996 |
| JP | 8-510428 A | 11/1996 |
| JP | 2001-113962 A | 4/2001 |

* cited by examiner

SUPPORT STRUCTURE OF HIGH PRESSURE CONTAINER

TECHNICAL FIELD

The present invention relates to a support structure of a container, particularly to a support structure of a high pressure container with neck portions at both ends of a longitudinal direction thereof.

BACKGROUND ART

Japanese Patent Application Laid-Open No. 2001-113962 discloses a support structure for accommodating a fuel cylinder in a concave portion on an automotive floor panel, where a main body of the cylinder is fixed by banding.

DISCLOSURE OF INVENTION

As the amount of fuel in the cylinder changes, an inner pressure thereof changes to expand or contract the cylinder. Particularly, an outer diameter of the main body changes to loosen the banding, resulting in failure of securing the cylinder.

An object of the present invention is to provide a support structure for securing a high pressure container.

An aspect of the present invention is a support structure of a container provided with neck portions on both ends of a longitudinal direction thereof, comprising: a first support member for supporting one of the neck portions of the container; a second support member for supporting the other of the neck portions of the container, and elastically pressing the container in the longitudinal direction thereof; and a frame to which the first and second support members are fixed.

BRIEF DESCRIPTION OF DRAWINGS

The invention will now be described with reference to the accompanying drawings wherein.

BEST MODE FOR CARRYING OUT THE INVENTION

Figure 1:
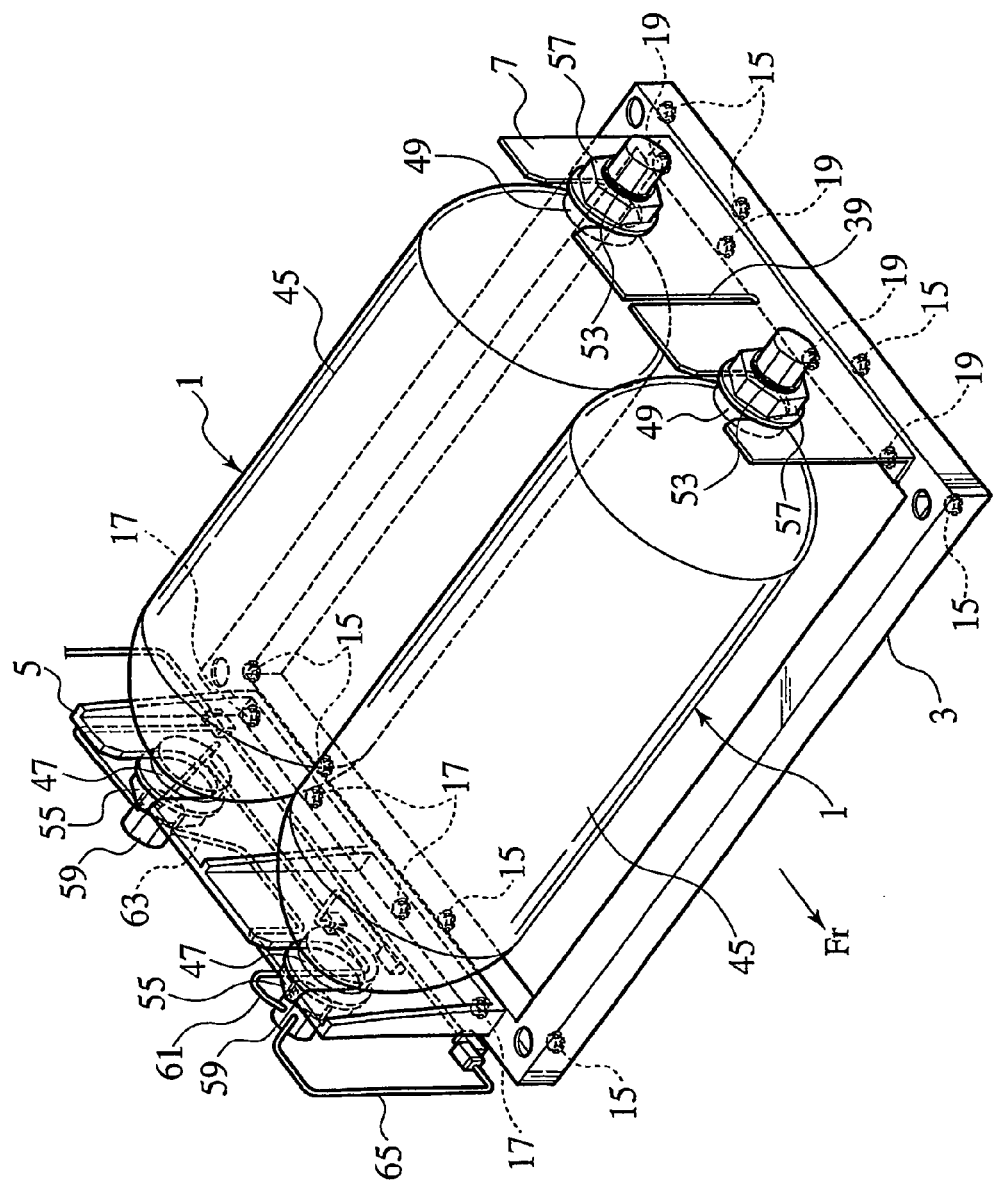
FIG. 1 is a perspective view of a support structure of a high pressure container according to an embodiment of the present invention.

Embodiments of the present invention will be explained below with reference to the drawings, wherein like members are designated by like reference characters. Note that an arrow Fr in each of FIGS. 1 to 3 indicates a front of a vehicle body.

Figure 2:
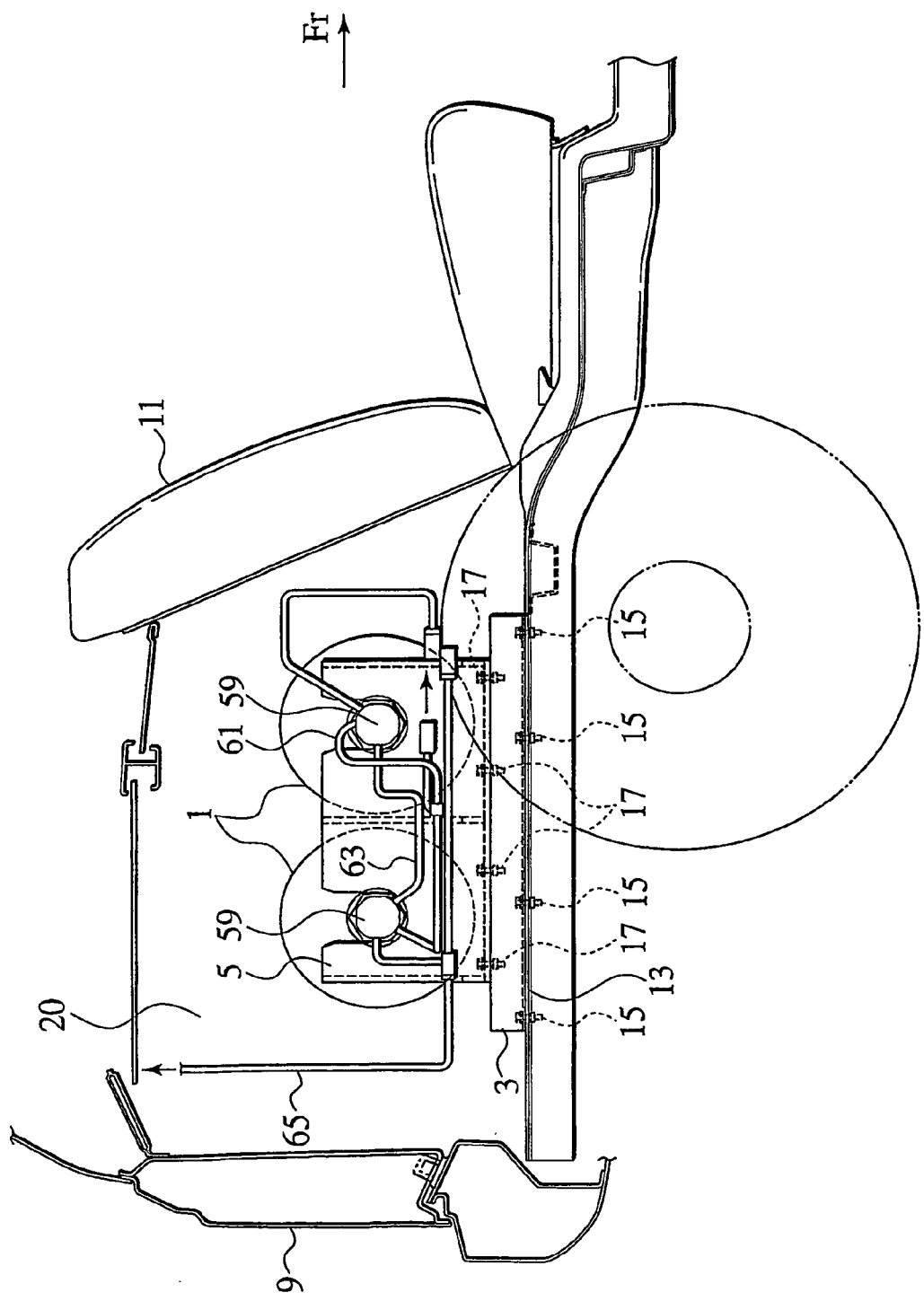
FIG. 2 is a side view of a rear vehicle body inside provided with the support structure of FIG. 1.
Figure 3:
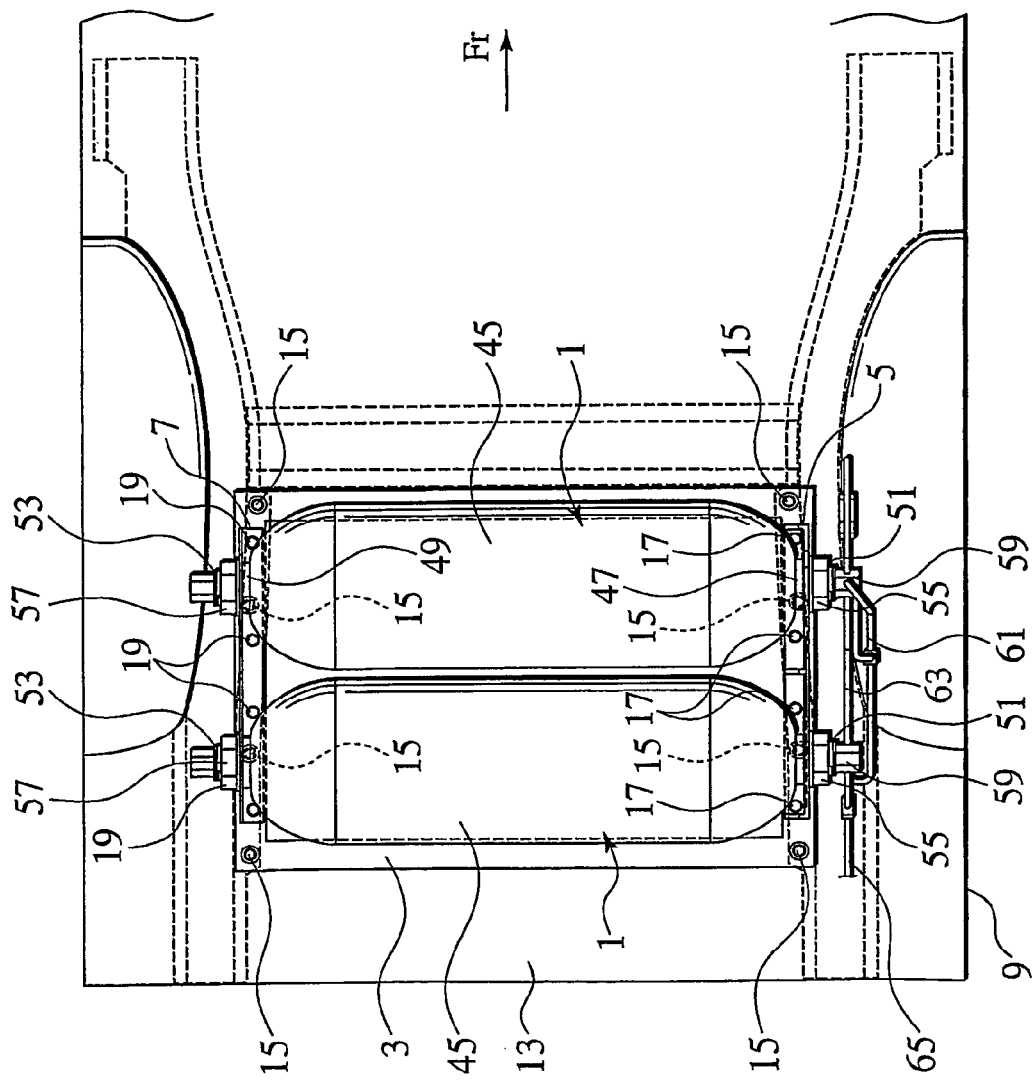
FIG. 3 is a plan view of the rear vehicle body inside provided with the support structure of FIG. 1.

As shown in FIG. 1, two high pressure containers 1 are arranged in parallel with each other, supported by a pair of support members 5 and 7 provided on a square frame 3, and then stored in a trunk room 20 behind a rear seat 11 in an automotive vehicle body 9 as shown in FIG. 2. As shown in FIGS. 2 and 3, the frame 3 is fixed on a floor panel 13 in the trunk room 20 by bolts and nuts 15. The support members 5 and 7 are fixed on the frame 3 by bolts and nuts 17 and 19, respectively.

Figure 4:
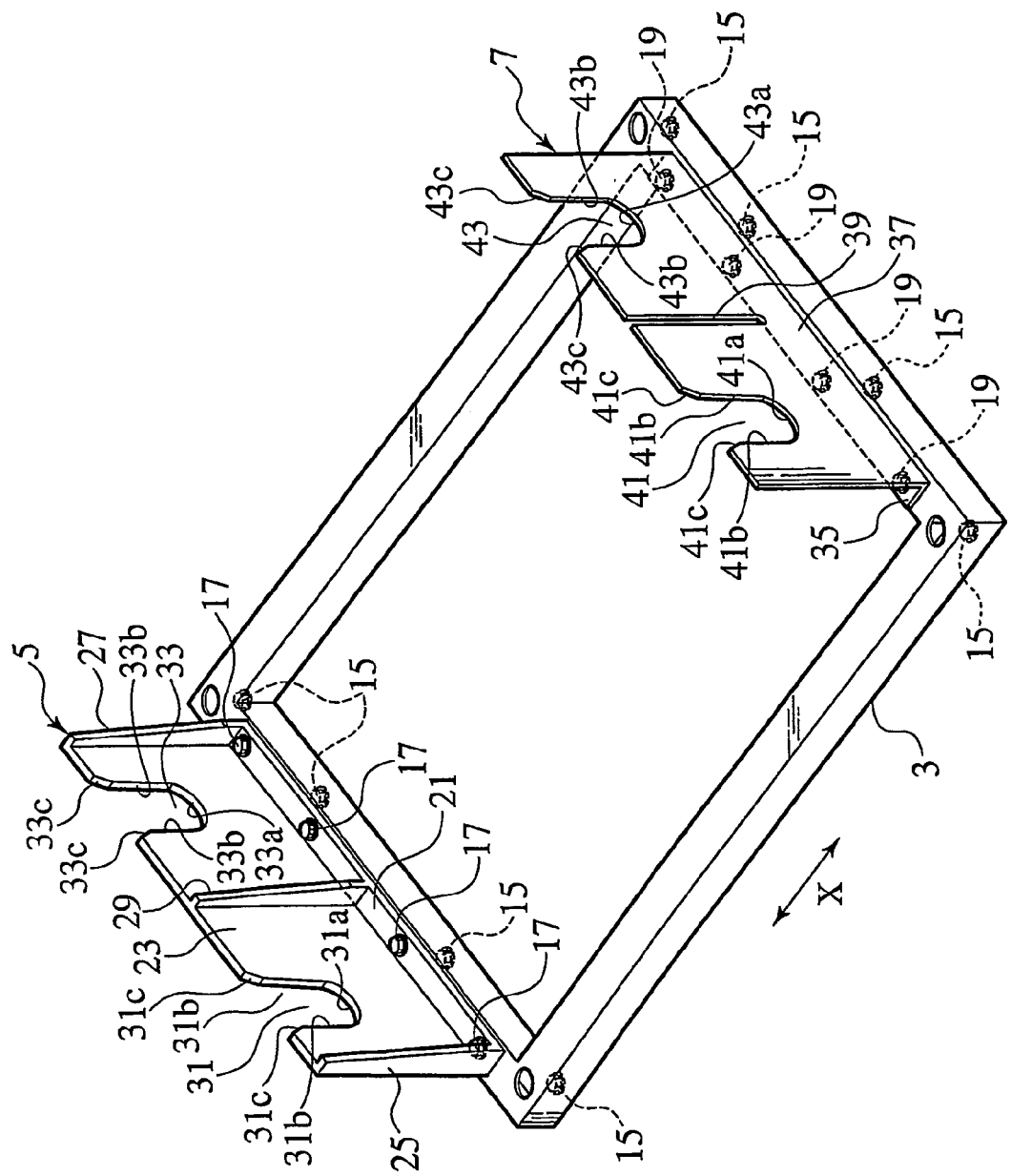
FIG. 4 is a perspective view of the support structure of FIG. 1 with the high pressure container removed.

As shown in FIG. 4, the first support member 5 includes a flange 21 as a base portion to be fixed on the frame 3 by the bolts and nuts 17, a supporting plate 23 standing upright on an outer side of the flange 21 in a vehicle transverse direction (X direction), ribs 25 and 27 formed on front and rear sides of the supporting plate 23, extending toward the second support member 7, and a center rib 29 formed on a central part of the supporting plate 23 in the vehicle longitudinal direction, extending toward the second support member 7. The flange 21, the supporting plate 23 and the ribs 25, 27, and 29 are integrally molded, for example by casting, to constitute a rigid body.

On the supporting plate 23 perpendicular to a longitudinal direction of the high pressure container 1, upwardly open U-shaped receiving portions 31 and 33 are formed with the center rib 29 interposed therebetween. Bottom rims 31a and 33a of the receiving portions 31 and 33 are respectively formed in circular-arc shapes to match a shape of a later-described first neck portion 47 of the high pressure container 1. Side rims 31b and 33b for guiding the neck portions are formed to be continuous from the bottom rims 31a and 33a. Spaces between opposing side rims 31b, 33b are respectively expanding upward (or become larger with increasing distance from the bottom rims 31a, 33a) to widen upper entrances of the side rims 31b and 33b more than those of the bottom rims 31a and 33a. Upper rims 31c and 33c are formed to be continuous from upper ends of the side rims 31b and 33b. Spaces between opposing upper rims 31c, 33c are further expanding upward.

As shown in FIG. 4, the second support member 7 includes a flange 35 as a base portion to be fixed on the frame 3 by the bolts and nuts 19, and a supporting plate 37 standing upright on an outer side of the flange 35 in the vehicle transverse direction. The flange 35 and the supporting plate 37 are integrally formed, for example by press forming, to constitute an elastic body.

The supporting plate 37 is provided with a slit 39 from an upper end to near the flange 35 on a central part thereof in the vehicle longitudinal direction.

On the supporting plate 37 perpendicular to a longitudinal direction of the high pressure container 1, upwardly open U-shaped receiving portions 41 and 43 are formed, with the slit 39 provided therebetween. Bottom rims 41a and 43a of the receiving portions 41 and 43 are formed in circular-arc shapes to match a shape of a later-described second neck portion 49 of the high pressure container 1. Side rims 41b and 43b for guiding the neck portions are formed to be continuous from the bottom rims 41a and 43a. Spaces between opposing side rims 41b, 43b are respectively expanding upward (or become larger with increasing distance from the bottom rims 41a, 43a) to widen upper entrances of the side rims 41b and 43b more than those of the bottom rims 41a and 43a. Upper rims 41c and 43c are formed to be continuous from upper ends of the side rims 41b and 43b. Spaces between opposing upper rims 41c, 43c are further expanding upward.

Figure 5:
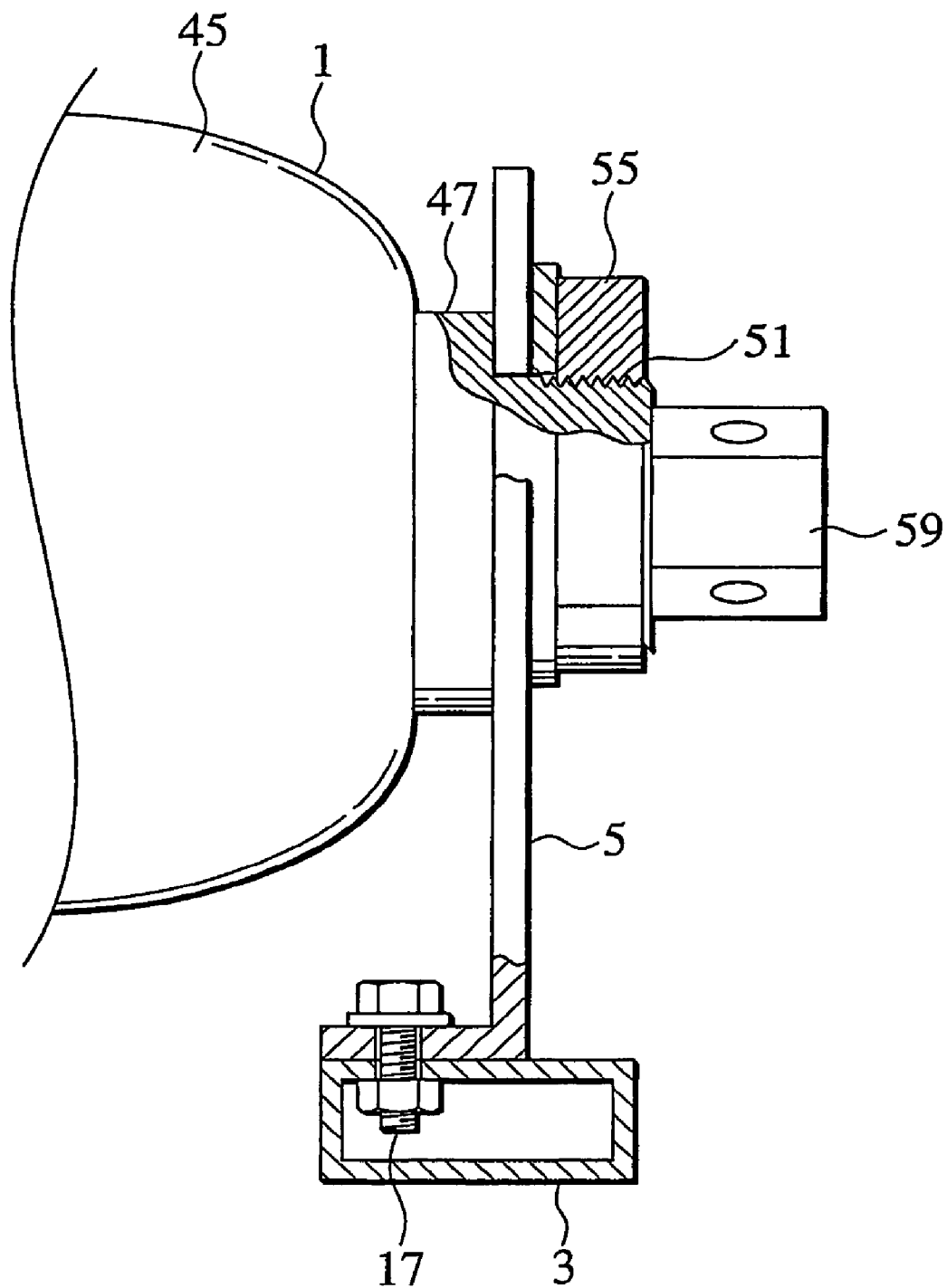
FIG. 5 is an explanatory view, partially cross sectioned, showing a neck portion of the high pressure container fixed in a support member of the support structure of FIG. 1, seen from rear side of the vehicle body.

Each of the two high pressure containers 1 has first and second cylindrical neck portions 47 and 49 provided in the vicinity of both ends of the main body portion 45 in the longitudinal direction, respectively. Male screws 51 and 53 are formed on ends of the first and second neck portions 47 and 49, respectively. The main body portions 45 are accommodated between the support members 5 and 7 in such a manner that the first neck portions 47 are inserted into the receiving portions 31 and 33 of the support member 5, respectively, and that the second neck portions 49 are inserted into the receiving portions 41 and 43 of the support member 7, respectively. In the above-described state, as shown in FIG. 5, nuts 55 and 57 are fastened to the male screws 51 and 53, respectively, thereby fixing the high pressure container 1 to the pair of support members 5 and 7. The support member 7 of the elastic body always presses toward a base side of the neck portion 49 (toward main body portion 45 or toward the first support member 5).

Figure 6:
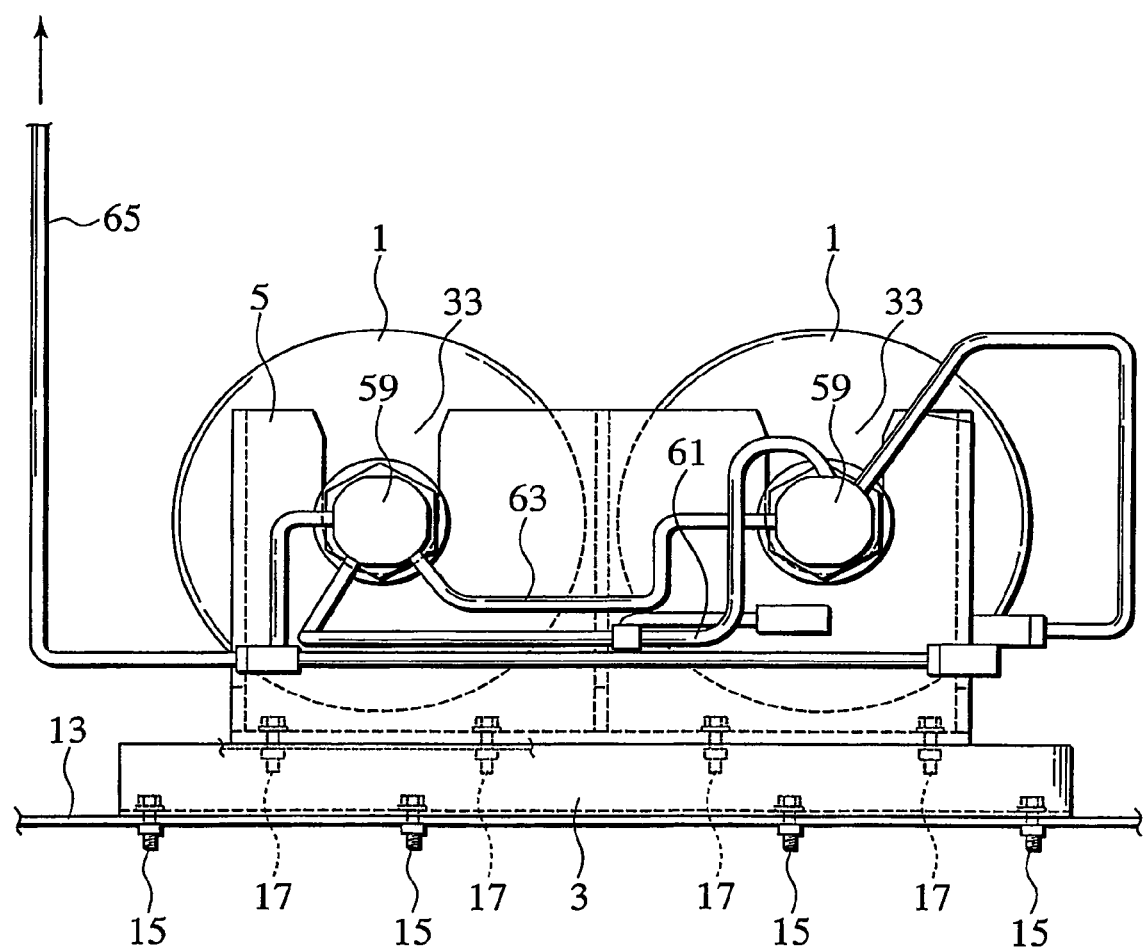
FIG. 6 is an enlarged side view of a pipe connecting portion of the high pressure container in the support structure of FIG. 1.

The high pressure container 1 includes a pipe connecting portion 59 on an end of the male screw 51 (see FIG. 3) of the first neck portions 47. In this embodiment, the high pressure container 1 is designed to store hydrogen to be supplied to a fuel cell (not shown) mounted on the vehicle body 9. As shown in FIG. 6, a hydrogen supply pipe 61 for supplying hydrogen to the fuel cell, a hydrogen filling pipe 63 for filling the high pressure container 1 with hydrogen from the outside, and a discharge pipe 65 for discharging internal hydrogen to the atmosphere in an emergency, for example an excessive internal pressure of the high pressure container 1, are connected to the pipe connecting portion 59. In FIG. 5, these pipes 61, 63 and 65 are not shown for the clarity.

Next, description will be made for an operation of the foregoing support structure of the high pressure container.

It is the first and second neck portions 47 and 49 on both ends of the high pressure container 1 that are supported by the support members 5 and 7, respectively. Thus, a change in the outer diameter of the main body portion 45 following an inner pressure change of the high pressure container 1 does not affect the fixing on the support members 5 and 7, whereby the high pressure container is stably secured.

A change in a longitudinal dimension of the high pressure container 1 following the inner pressure change, or variance in the longitudinal dimension among products, is absorbed by the support member 7 made of the elastic body, supporting the second neck portion 49 to always press toward the base side (toward main body portion 45 or toward the first support member). Thus, the high pressure container 1 is stably fixed. This eliminates costs for any dedicated elastic members such as rubber for absorbing the above-described change in the longitudinal dimension or variance therein among the products, and possibility of deterioration with time in the support member 7, improving reliability.

Being made of a plate material, the support member 7 has high rigidity in a direction perpendicular to the longitudinal direction of the high pressure container 1, and surely hold a heavy load of the high pressure container 1 while flexibly dealing with the change in the longitudinal dimension thereof. The support member 7 provided with the slit 39 between the receiving portions 41 and 47, 77 and 79 for the two high pressure containers 1 can individually deal with the variance among the products and the change in the longitudinal dimension of each high pressure container 1.

In addition, the receiving portions 31 and 33, and 41 and 43 of the support members 5 and 7 for inserting therein the first and second neck portions 47 and 49, respectively, are formed to have upper entrance of the side rims 31b and 33b, and 41b and 43b wider than that of the bottom rims 31a and 33a, and 41a and 43a. Thus, the high pressure containers 1 with its neck portions in various dimensions can be fixed to the support members 5 and 7. The high pressure container 1 can be loaded from the rear side of the vehicle body after the frame 3 is fixed on the floor panel 13 of the vehicle body 9. The loading is facilitated especially in a narrow space such as the trunk room 20.

Since the first neck portion 47 with the pipe connecting portion 59 of the high pressure container 1 is supported by the support member 5 made of the rigid body, the pipe connecting portion 59 is not displaced even if a change occurs in the longitudinal dimension of the high pressure container 1, whereby the various pipe connections thereof (hydrogen supply pipe 61, hydrogen filling pipe 63, and discharge pipe 65) are secured.

Figure 7:
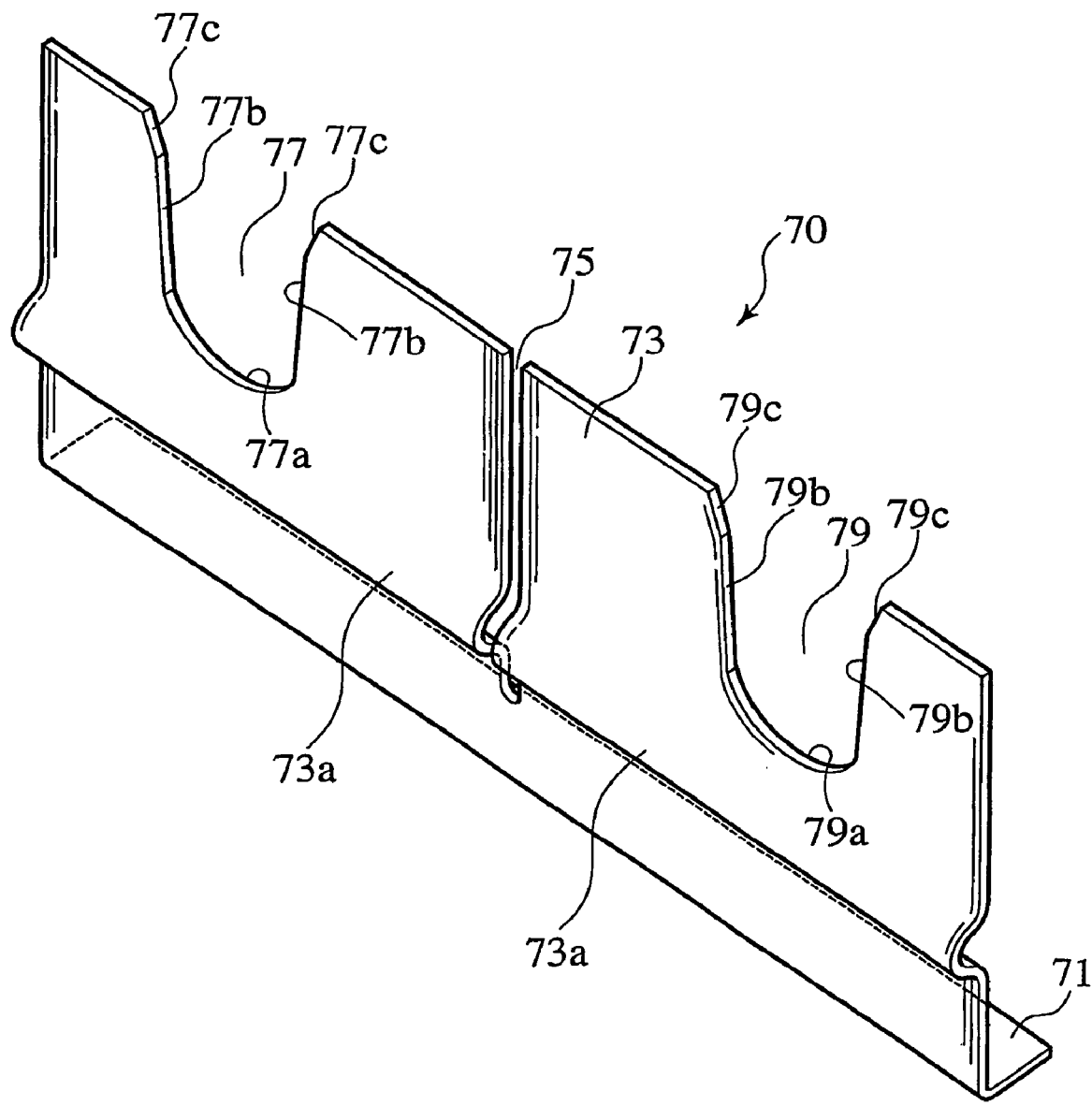
FIG. 7 is a perspective view showing another embodiment of a support member for supporting neck portions of the high pressure container.

FIG. 7 is a perspective view showing another embodiment of a support member 70 for supporting the second neck portion 49 of the high pressure container 1. As in the case of the foregoing support member 7, this support member 70 includes a flange 71 as a base portion to be fixed on the frame 3 by the bolts and nuts 19, and a supporting plate 73 standing upright on an outer side of the flange 71 in the vehicle transverse direction. The flange 71 and the supporting plate 73 are integrally formed, for example by press forming, to constitute an elastic body.

The supporting plate 73 is provided with a slit 75 from an upper end to near the flange 71 on a central part thereof in the vehicle longitudinal direction.

On the supporting plate 73 perpendicular to a longitudinal direction of the high pressure container 1, upwardly open U-shaped receiving portions 77 and 79 are formed, with the slit 75 provided therebetween. Bottom rims 77a and 79a of the receiving portions 77 and 79 are formed in circular-arc shapes to match a shape of a later-described second neck portion 49 of the high pressure container 1. Side rims 77b and 79b for guiding the neck portions are formed to be continuous from the bottom rims 77a and 79a. Spaces between opposing side rims 77b, 79b are respectively expanding upward (or become larger with increasing distance from the bottom rims 77a, 79a) to widen upper entrances of the side rims 77b and 79b more than those of the bottom rims 77a and 79a. Upper rims 77c and 79c are formed to be continuous from upper ends of the side rims 77b and 79b. Spaces between opposing upper rims 77c, 79c are further expanding upward.

In this embodiment, a bent portion 73a protruding outward in the vehicle transverse direction (side opposite the main body portion 45 of the high pressure container 1) is formed over a full width of the supporting plate 73 in the vehicle longitudinal direction between the flange 71 and the receiving portions 77 and 79. Being provided with the bent portion 73a, the supporting plate 70 can deal, without reducing a plate thickness thereof, with the change in the longitudinal dimension of the high pressure container 1 or the variance therein among the products more flexibly while maintaining high rigidity in the direction perpendicular to the longitudinal direction of the high pressure container 1.

The present disclosure relates to subject matter contained in Japanese Patent Application No. 2001-332721, filed on Oct. 30, 2001, the disclosure of which is expressly incorporated herein by reference in its entirety.

The invention may be practiced or embodied in other ways without departing from the sprit or essential character thereof. For example, the fixing of the support members 5, 7 and 70 on the frame 3 may be carried out not by fasteners such as bolts and nuts but by welding. Moreover, the high pressure container 1 may be filled with high pressure fuel other than hydrogen.

The preferred embodiment described herein is therefore illustrative and not restrictive, the scope of the invention being indicated by the claims, and all variations which come within the meaning of claims are intended to be embraced herein.

INDUSTRIAL APPLICABILITY

As described above, according to the support structure of the high pressure container of the present invention, since the neck portions in both ends of the high pressure container are supported by the support members, the outer diameter change of the high pressure container does not affect the fixing on the support members. The change in the longitudinal dimension of the high pressure container following the inner pressure change or the variance therein among the products is absorbed by the elastic deformation of the support member for supporting one of the neck portions of the high pressure container. This eliminates costs for any elastic members such as rubber as the absorbers, and possibility of deterioration with time in the support member of the support structure, thus improving reliability. Therefore, the support structure of the invention is useful as the support structure of the high pressure container.

The invention claimed is:

1. A support structure of a container provided with neck portions on both ends of a longitudinal direction thereof, comprising:
    a first rigid support member for rigidly supporting one of the neck portions of the container in the longitudinal direction thereof, wherein the first support member supports the neck portion of the container on a side to which a pipe is connected;
    a second support member for supporting the other of the neck portions of the container, the second support member being made of a plate material segmented to elastically press the container in the longitudinal direction thereof; and
    a frame to which the first and second support members are fixed.

2. The support structure according to claim 1, wherein the second support member supports a plurality of the containers arranged in parallel, and has a slit between receiving portions for the containers.

3. The support structure according to claim 2, wherein the slit is arranged from a top of the plate material toward the frame.

4. The support structure according to claim 2, wherein the slit is extended in a direction crossing the frame.

5. The support structure according to claim 1, wherein the first and second support members include U-shaped receiving portions with entrances wider than their bottoms, in which the neck portions of the container are inserted from a direction perpendicular to the longitudinal direction of the container.

6. The support structure according to claim 5, wherein the U-shaped receiving portions comprise side rims running in a parallel direction for guiding the neck portions.

7. The support structure according to claim 1, wherein the second support member includes a base portion to be fixed on the frame, a receiving portion for receiving the neck portion of the container, a straight portion perpendicular to and contacting the base portion, and a bent portion between the straight portion and the receiving portion.

8. A support structure of a container provided with neck portions on both ends of a longitudinal direction thereof, comprising:
    a first rigid support member for rigidly supporting one of the neck portions of the container in the longitudinal direction thereof, wherein the first support member supports the neck portion of the container on a side to which a pipe is connected;
    a second support member for supporting the other of the neck portions of the container, the second support member being made of a plate material segmented to elastically press the container always in the longitudinal direction thereof toward the first support member; and
    a frame to which the first and second support members are fixed.

9. A method for supporting a container provided with neck portions on both ends of a longitudinal direction thereof, comprising:
    rigidly supporting one of the neck portions of the container on a side to which a pipe is connected, in the longitudinal direction thereof on a frame by a rigid body fixed to the frame; and
    supporting the other of the neck portions of the container on the frame by an elastic body fixed to the frame, the elastic body being made of a plate material segmented to elastically press the container in a longitudinal direction thereof.

10. The supporting method according to claim 9, wherein the elastic body always presses the container toward the neck portion supported by the rigid body.

11. The supporting method according to claim 10, wherein the elastic body includes a base portion fixed on the frame, a receiving portion for receiving the neck portion of the container, a straight portion perpendicular to and contacting the base portion, and a bent portion between the straight portion and the receiving portion.

12. A method for supporting a plurality of containers arranged in parallel, each provided with neck portions on both ends of a longitudinal direction thereof, comprising:
    rigidly supporting one of the neck portions of each container in the longitudinal direction thereof on a frame by a rigid body fixed to the frame; and
    supporting the other of the neck portions of the container on the frame by an elastic body fixed to the frame, the elastic body being made of a plate material segmented to elastically press each of the containers toward the neck portion thereof supported by the rigid body, the elastic body including receiving portions for receiving the neck portions of the containers and a slit arranged between the receiving portions from a top of the plate material toward the frame.

* * * * *